Nov. 21, 1950   E. C. PETRIE ET AL   2,530,722
AUTOMATIC VALVE ACTUATING CONTROL SYSTEM
Filed May 2, 1946   6 Sheets-Sheet 1

Inventors:
James Trefil, &
Eugene C. Petrie
By Joseph O. Lange
Atty.

Inventors:
James Tretil, &
Eugene C. Petrie:
By Joseph O. Lange Atty.

Nov. 21, 1950      E. C. PETRIE ET AL      2,530,722

AUTOMATIC VALVE ACTUATING CONTROL SYSTEM

Filed May 2, 1946      6 Sheets-Sheet 6

Inventors:
James Trefil, &
Eugene C. Petrie;
By Joseph O. Lange
Atty.

Patented Nov. 21, 1950

2,530,722

UNITED STATES PATENT OFFICE 2,530,722

AUTOMATIC VALVE ACTUATING CONTROL SYSTEM

Eugene C. Petrie, Elmhurst, and James Trefil, Berwyn, Ill., assignors to Crane Co., Chicago, Ill., a corporation of Illinois Application May 2, 1946, Serial No. 666,628

14 Claims. (Cl. 137—153)

This invention relates to improvements in pipe line control means. More particularly it applies to a novel automatic control system functioning to close the main valve in a pipe line in the event that a line break occurs on either side of the said valve.

An important object is to provide broadly a pipe line control system in which the affected valve can be opened manually by closing suitable valves located at an operating unit in the event that additional repairs are necessary.

A more important object is to provide an automatic pipe line control system in which the valve is made to close automatically at a predetermined drop in pressure and thereafter remaining closed regardless of any pressure increase occurring after the valve is closed. Further, an additional advantage lies in the fact that manual setting of the controls allows for automatic opening after the repairs have been made in the pipe line.

Another important object is to provide a pipe line control system whereby the main valve can be manually operated by said controls, the latter preferably being equipped with a finger tip actuating device of the class hereinafter described to permit automatic closing and opening, which socalled finger tip device also allows for the complete shut off of pressure to the actuator means as hereinafter described to permit manual operation of the main valve, if required.

Another important object is to provide an automatic pipe line control system in which the valve is made to close automatically at a predetermined drop in pressure and to open automatically when the line pressure rises to a predetermined value.

Another object is to provide in a pressure control system a construction in which a tank or reservoir is employed whereby regardless of the drop in pressure on the main line sufficient pressure is then available to operate a suitable motor actuator or hydraulic operating means for closing the main valve when a break occurs in such main pipe line.

A further object is to provide a piping system of the type hereinafter described in which an actuating control is effected which reduces the main line pressure to the required pressure necessary in order to operate the air or other fluid operated actuator for the main valve.

A further object is to provide in a pressure control system a means whereby in the event that the pressure regulator of the line fails, pressure may be discharged to and through a relief valve to atmosphere so as to safeguard the air-motor or other fluid actuator against injury from excessive line pressure.

Other equally important objects and advantages will become more readily apparent upon proceeding with the specification read in light of the accompanying drawings in which.

Figure 1:
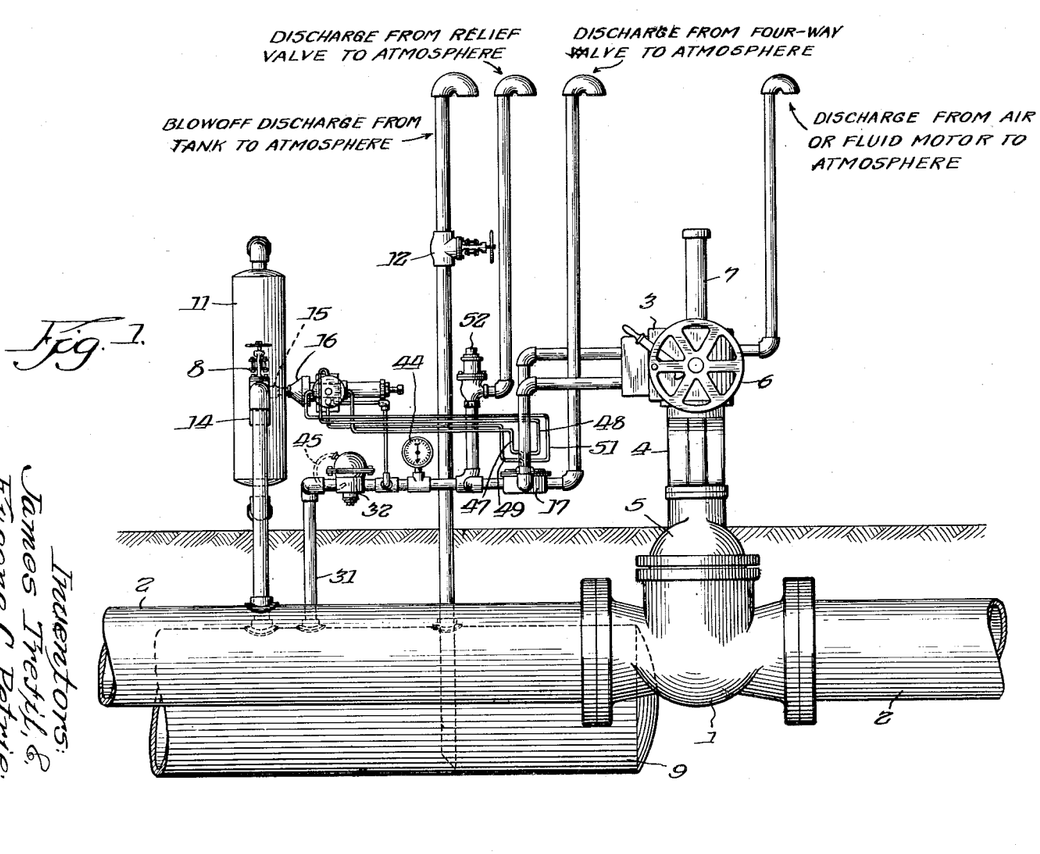
Fig. 1 is a front general assembly view of the automatic valve closing control system embodying our invention.

Referring to the drawings and particularly to the general piping arrangement shown in Fig. 1, the main line valve which is generally designated by the numeral 1, is shown installed upon a main pipe line 2. It may either be a conventional gate, globe or angle valve or the like depending upon the character of the service for which it is to be employed and is preferably operated by means of air or other fluid pressure as distinguished from manual means or electrical operation. Thus at the upper portion of the valve, as generally designated 3, is an air-motor unit mounted upon the yoke 4 and the bonnet 5 with the usual means on the side for manual operation of a handwheel 6 and preferably having a dust-proof cover for the reciprocably moving valve stem as designated at 7. It is deemed unnecessary to disclose the details of the air-motor structural means of operation since this is identical to that construction employed in connection with the Crane Co. Patent No. 1,886,518, issued November 8, 1932, to Clinton H. Beckwith. However, in the instant application instead of using the usual compressed air as therein referred to, it is preferable to employ such fluids as may be available or present in greater abundance, as for example using composite natural gas. It may either be pure natural gas or a mixture of artificial gas and natural gas obtainable in the oil field transport lines and carried through such long pipe lines to population centers for industrial power, lighting and domestic uses. It will of course be apparent that depending upon the nature of the fluid being used to actuate the valve the materials employed for the parts named in the patent will change accordingly. For example, the motor rotor blade of the operator or in the valves used in the piping system cooperating with the motor changes may be made to suit conditions. However, this is not a part of this invention and it is specifically disclaimed.

It is important to realize in considering the significance of this contribution that heretofore devices employing differential pressure have been used to close the main valve in the event of line failure. However, most of these devices have been objectionable because of their greater expense in upkeep, uncertainty of response and also in the cost of the original installation. In many instances they have not been entirely reliable due to critical adjustments required from time to time to suit line changes.

The instant contribution is relatively less expensive to construct, install and to maintain. It requires no critical adjustments and is sufficiently flexible to lend itself capable of being installed for a wide range of purposes and pressures.

Normally while in line operation, the main valve 1 is in open position with the provision that when the line pressure drops to a predetermined level, the main valve, for reasons hereinafter set forth in detail, will close and remain closed until the necessary repairs are made.

In general, a more clear understanding of the function of the piping system hereinafter described may be obtained by realizing the automatic control valve of the system is manually tripped initially to its open position and thereby provides for the automatic opening of the main valve through the fluid actuator. The natural gas or other line fluid that may be conveyed in the pipe line, is drawn or excerpted from the main line and passes initially through a globe or other suitable shut-off valve which is generally designated 8 and is preferably located as close to the tank or reservoir 9 as possible. Preferably when first filling the reservoir 9 the globe valve 8 is only slightly open so that the gas passing therethrough will move slowly through a filtering container of silica gel, designated generally 11, so that all or most of the moisture content within the gas being transported will be removed. After the reservoir 9 is filled, the globe valve 8 is then preferably opened wide. It is obvious that it may also be used to shut off the entire system in the event of failure of any part of the system in view of its location in proximity to the tank 9. After closing the valve 8, the blow-off valve, designated 12, which is directly attached to the reservoir 9 is opened thereby releasing all pressure in the system so that repairs may be made if desired.

The actuating fluid, such as natural gas, passes through the strainer 13 which has for its prime function the protection of the system against damage from dirt, grit, scale and such other foreign matter within the line gas, and thus to enhance the proper performance of the several moving parts of the system. The line gas then passes through the drip well 14, which has for its function the removal of free moisture within the line gas, the latter fluid then passing through the tank of silica gel 11 which as previously stated removes the moisture also present to some extent in the gas. The content of the latter container of silica gel is variable depending upon the number of operations desired of the main valve 1 and thereby determining the amount of gas being conveyed through the system. Under normal circumstances, it may be stated that the maximum number of operations of the main valve will be approximately six per year, but of course this will vary with the type of service for which the valve is intended. After such predetermined length of service, the silica gel as a substance is removed and the container 11 is then refilled. It is of course a characteristic of silica gel as a substance that the moisture is removable therefrom and the gel can again be used later, after such removal. It should be realized that in view of the diaphragm type of construction used in the several valves hereinafter to be described, the precaution of removing as much moisture as possible is taken because at low temperatures the contained moisture might freeze with the result that the valves and piping system might not of course function properly.

After passing through the container 11 of silica gel the gas then passes through a T 15 to which side outlet thereof the automatic control valve generally designated 16 is connected. The latter control valve cooperates with the four-way diaphragm valve generally designated 17, the detailed construction and its operation which will be hereinafter described.

Figures 4, 5:
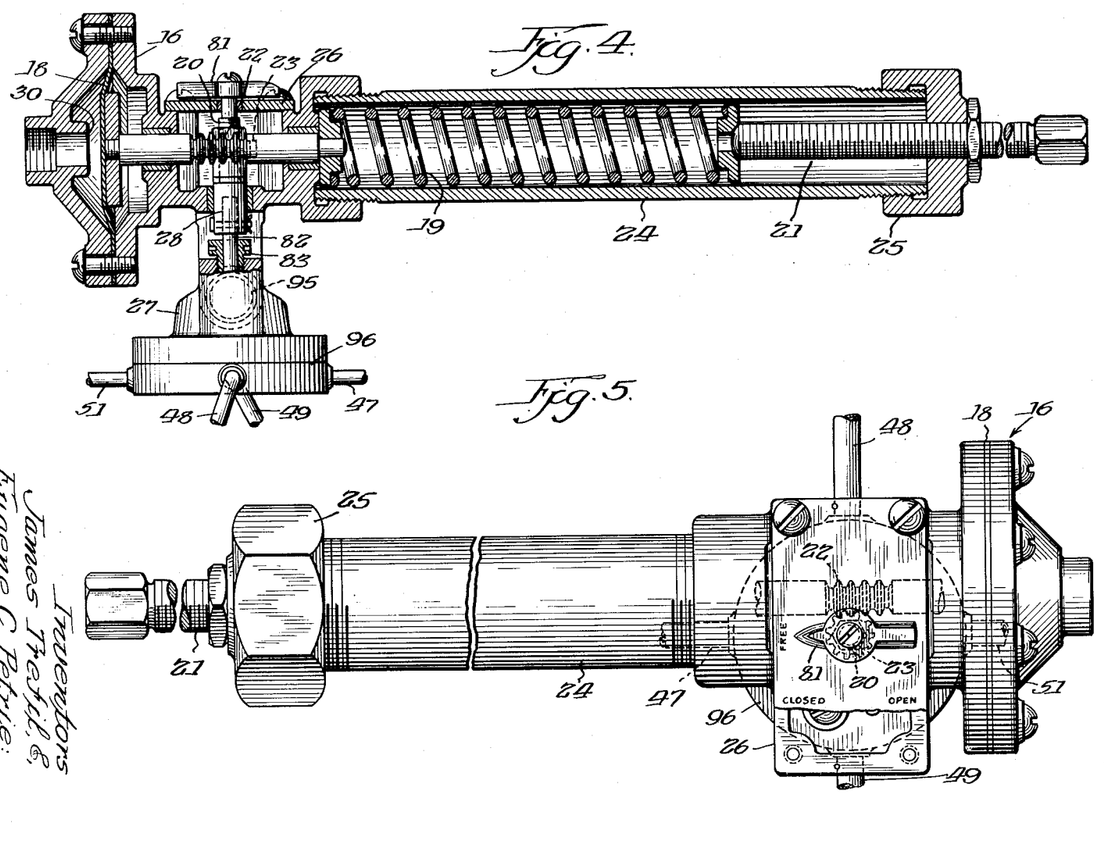
Fig. 4 is a fragmentary longitudinal sectional assembly view of the pressure reducing valve employed.
Fig. 5 is an exterior plan view of the pressure reducing valve described in Fig. 4.
Figure 6:
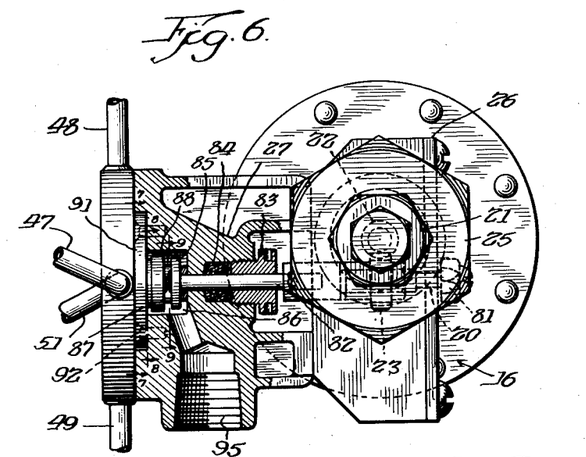
Fig. 6 is an end view of the pressure reducing valve with fragmentary sectional view of the pilot valve employed in connection therewith.

As shown more clearly in Fig. 4, the automatic valve 16 is of a diaphragm construction with the line fluid pressure being applied to the underside or bottom of the diaphragm 18. The latter member is spring loaded as indicated at 19, with suitable adjustment provided as at 21 with the adjusting screw for the compression of the spring. By suitable movement of the diaphragm the rack 22 is moved, causing corresponding rotation of the spur gear 23, a portion of which is shown in Fig. 5. It will thus be clear that by predetermined rotation of the latter spur gear, the positioning of the stem or shaft 20 is determined for reasons hereinafter explained in connection with Fig. 6. This arrangement of the device is referred to as "finger-tip control" by those persons skilled in the art.

The spring 19 is preferably contained within the enclosing cylinder 24 which at its upper portion is provided with the cap 25 suitable for threadedly mounting the spring adjusting screw 21. The shaft 20 upon which the spur gear 23 is mounted non-rotatably permits of the automatic control valve having what is termed a free position in which line fluid pressure may be applied to the top of the diaphragm of the four-way valve 17 through the port which supplies pressure to the valve fluid motor and thereby sealing off all pressure to the fluid motor and to the remaining ports of the four-way valve from the fluid motor discharge to atmosphere. This provision thereby permits manual operation at wheel 6 of the main valve when necessary or required without interference by line pressure within the balance of the system. The cap 26 serves as the upper bearing for the journaling of the shaft 20. The detailed function of the lower portion of the extension 27 within the pressure reducing valve 16 will also be described later in connection with Fig. 6.

The spur gear 23 is supported at its lower portion within the bearing generally designated 28, and at the lower portion of the stem 20 within the extension 27. Its function will also be clear in connection with the later description of the operation of the diaphragm valve 17.

Continuing with a description of the piping system in sequence of the normal flow of fluid through the several fittings and valves, the line fluid passes through a horizontal check valve 29 which has for its function the retention of the line pressure within the reservoir 9, regardless of the drop in pressure in the main line 2. Thus when a rupture or break occurs in the main line, the pressure within the reservoir 9 is available to operate the fluid or air motor 3 which thus closes the main valve independent of the fluid loss that may have taken place within the main line. As shown in Fig. 1, directly connected to the reservoir 9 is the outlet pipe 31 having connected thereto the pressure reducing regulator 32 through which the line fluid passes and which by its setting reduces the main line pressure in the system to the required pressure necessary to operate the fluid or air motor. The valve 32 is a conventional reducing regulator and its details are shown more clearly in the sectional assembly view of Fig. 7.

Figure 2:
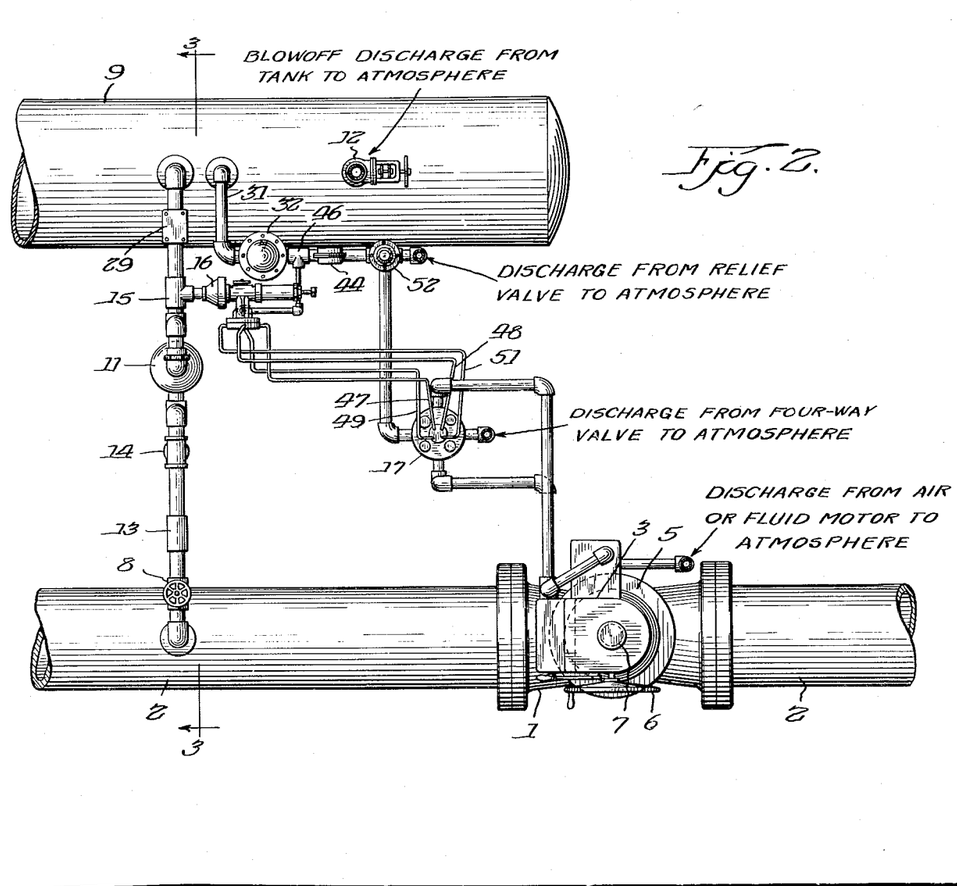
Fig. 2 is a similar plan view of the system shown in Fig. 1.
Figures 3, 14:
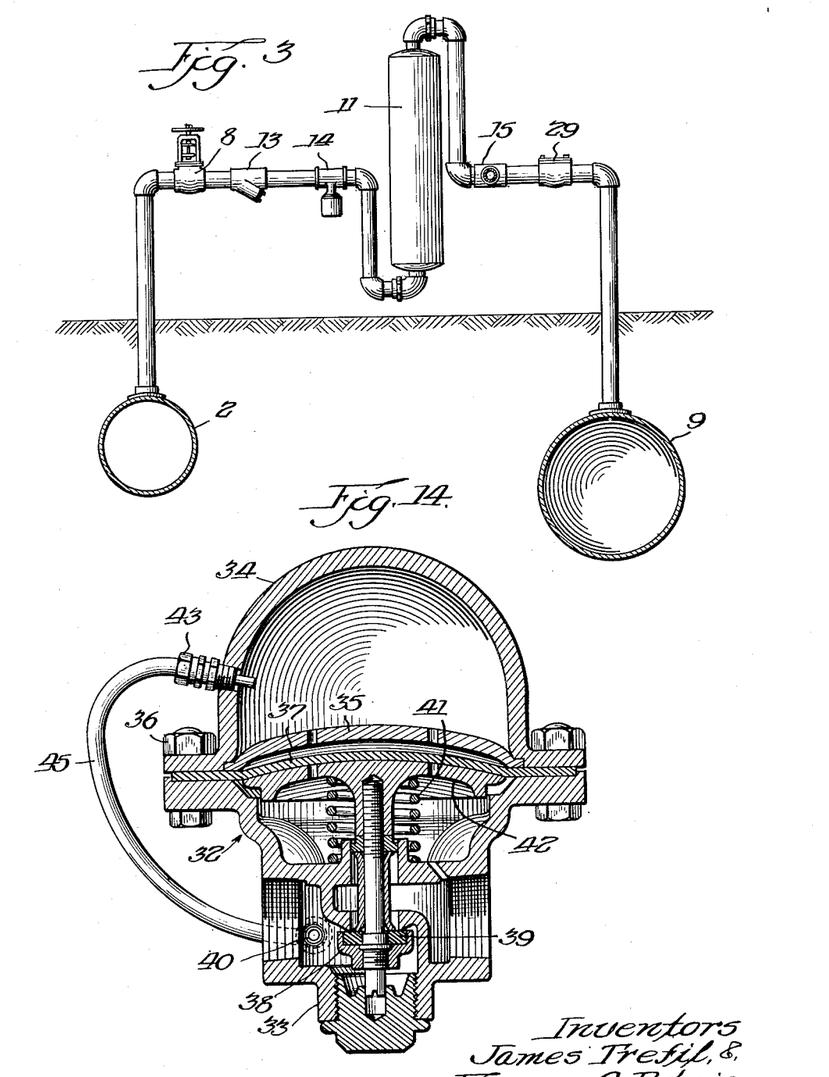
Fig. 3 is a similar end sectional view taken along the line 3—3 of Fig. 2.
Fig. 14 is a sectional assembly view of the pressure reducing regulator employed in the system.

Referring now to Fig. 14, the valve 32 is provided with a body or casing 33 and a dome 34 which is fitted as a cap to accommodate the dome plate 35 and is attached to the body by means of the bolts 36 having interposed therebetween the diaphragm 37. The main valve 38 provided with a closure member or disc 39 seated with an upper umbrella-like part against an under portion of the diaphragm as shown, the disc being normally held against the seat indicated by means of the spring 41, the upper extension of the disc 38 being provided with the umbrella-like portion 42 shaped to fit the arcuate concave section of the diaphragm 37. For relieving excess pressure on the upper side of the diaphragm, an air sealing cap 43 is provided. The latter fitting may also be used to adjust the supply of pressure from the pipe line into the dome or cap 34 by means of a flexible tube 45 as shown in Fig. 14, thereby maintaining the required working pressure and is connected to the lower body portion at 40. Referring to Fig. 2, the gauge 44 is preferably furnished in order that the proper discharge or operating pressure may be accurately determined in case the line fluid pressure should either drop or increase. By means of the T designated 46, a connection is made with the side of the automatic control valve 16 as indicated, to thereby supply pressure by means of the four tubes shown and designated 47, 48, 49 and 51, which lead to and connect with similar openings in the top of the four-way diaphragm valve 17, and which is in accordance with the invention set forth in Patent No. 2,352,629 to Donald A. Griswold and entitled "Fluid Distribution and Control Apparatus," granted July 4, 1944.

It should be understood that in connection with the by-pass tube 45 for depressing the chamber within the dome 34, the loading tube 43 is preferably made a relatively secure connection in its attachment to the dome. However, the coupling to the valve body at 40 is preferably loosely made and is intentionally made thusly so as to avoid charging up the dome chamber rapidly to the initial pressure. Preferably a small reciprocably movable valve (not shown) may be placed in the line at the connection 40 so that it may be opened upon making the said connection. When the valve is slightly opened, then the gauge in the downstream line designated at 44 is watched closely and when it reads to the desired pressure, the connection is broken quickly at the end of the tube, thus stopping the flow of air or line fluid to the dome. The tube 45 may be disconnected at both ends and replaced by suitable caps. To lower the pressure in the downstream line the connection at 43 may be removed and the valve stem of the valve not shown may be depressed as in the case of an automobile tire so as to release the desired amount of air accumulating in the chamber of the dome 34.

Continuing with the description of the passage of the line fluid through the piping system, and referring to Figs. 2 and 3, a relief valve 52 is also provided which is preferably set for discharge at a pressure slightly higher than the discharge pressure of the pressure reducing regulator 32. Thus in case of the failure of the latter valve, the pressure of the line fluid will be discharged through the relief valve 52 to atmosphere thereby safeguarding the fluid motor actuating apparatus.

Figure 10:
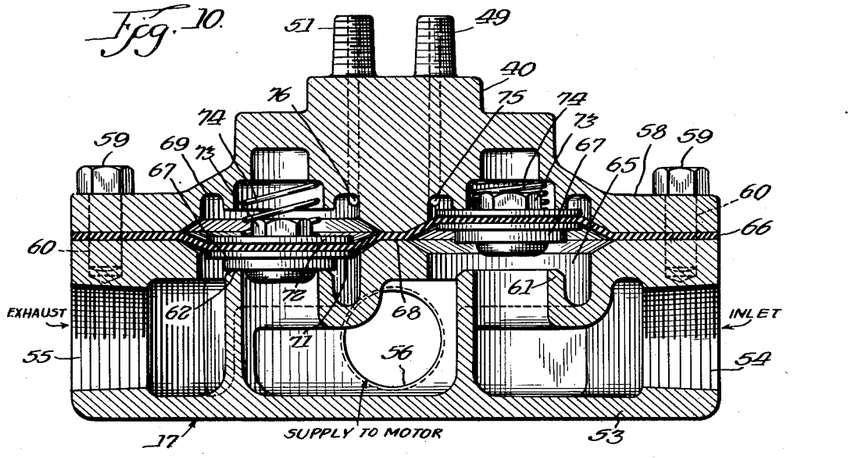
Fig. 10 is a sectional assembly view of the four-way diaphragm valve used in the novel piping system comprising this invention.
Figure 11:
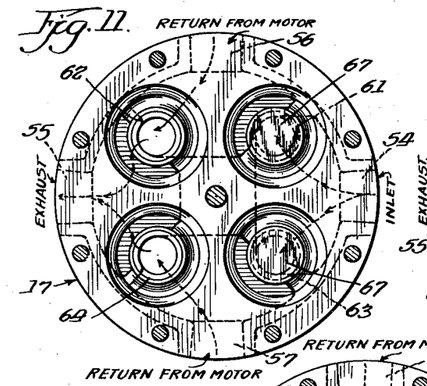
Figs. 11, 12, and 13 are sequential views in connection with the operation of the four-way valve shown in Fig. 10.

As previously stated, the automatic control valve 16 handles the flow of line fluid to the fluid motor having interposed between it and the fluid motor 3 the four-way diaphragm valve 17, a cross-sectional view of which is shown with more clarity in Fig. 10. The four-way valve casing 53 is of substantially circular configuration when viewed in plan and is provided with the four openings such as the inlet 54, the exhaust 55, the supply to the motor 56 (see Fig. 12) and the return from the motor 57. At the upper portion of the casing 53, shown more clearly in Fig. 10, a cap or bonnet 58 is positioned being held in place by conventional bolts 59, the casing having the respective inlet and exhaust, the supply to the motor, and the return from the motor oppositely disposed and preferably in the same horizontal plane. The valve seats 61 and 62 which also are shown more clearly in Fig. 11 are supplemented with similar valve seats 63 and 64 below each of the chambers which are provided above all of the valve seats. The single interposed diaphragm 66 preferably on its underside is provided with a valve disc 67 suitable for use against each of the valve seats 61 to 64 inclusive. The diaphragm 66 is clamped not only on its outer periphery between the cap 58 and the casing 53 but also preferably at its center portion as indicated at 68 and annularly to mark the limits of the chambers above each of the valve seats. Above the diaphragm and above each of the valve seats, the cap 58 is hollowed so as to provide a chamber 69 above the diaphragm opposite each of the valve seats. Within the latter chambers the diaphragm has the oppositely positioned valve plates preferably for stiffening the diaphragm as indicated at 71 and 72 above and below respectively. The plates are held by means of the bolts 73 to the diaphragm. Above the plate 72 is a coiled spring in each case, designated 74. In each of the chambers 69 are air inlets 75, 76, 77 and 78 respectively leading to the four lead pipes 47, 48, 49 and 51 respectively. It should of course be understood that the chamber 69 is circular in form and therefore is sealed independently to form independent tight chambers above the diaphragm 66 and opposite each of the respective seats designated at 61, 62, 63 and 64.

Figure 12:
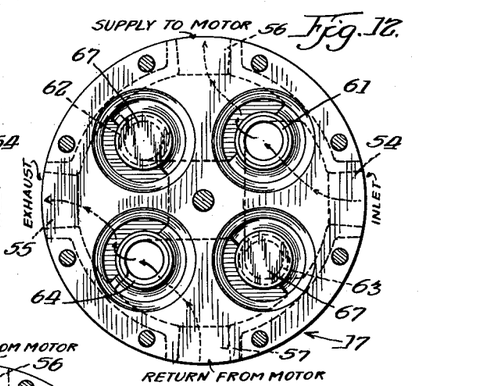
Figure 13:
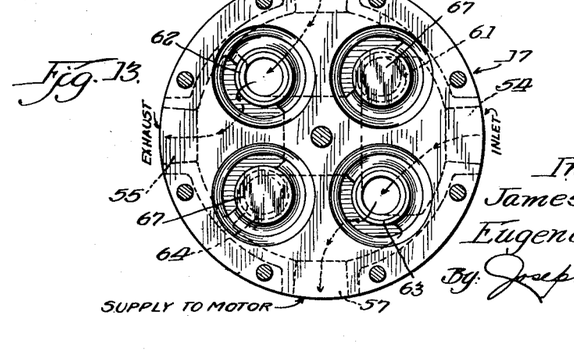

Thus the air or other line fluid from the main line traveling over the diaphragm, will have a path of flow similar to that shown diagrammatically in Figs. 11 to 13 inclusive. Referring to Fig. 10, for manual operation, supports designated by the seat references 63 and 61, are closed, which is in the free position of the finger-tip control which is hereinafter described in greater detail. Thus the path of flow is from the return from the motor to the exhaust. By the term "free-operation" it is of course understood that the main valve may be manually operated if necessary and under such conditions all fluid pressure is removed from the fluid motor so as to make the latter relatively free operating. Therefore as shown in Fig. 11 from both directions, that is from both supply and return from the motor, pressure is being taken from it. Thus the valve seats 62 and 64 are open while the valve seats 63 and 61 are closed.

Referring to Fig. 12, the four-way valve is shown in a position for closing the main valve, that is automatically by means of line fluid pressure. In this case the valve seats 62 and 63 are closed and therefore the pressure moves from the inlet to the supply to the motor and from the return from the motor to the exhaust. This arrangement is only used for closing the valve.

When the main line valve is being automatically opened, as in Fig. 13, then the ports or seat openings designated 64 and 61 are closed and therefore the line fluid moves from the inlet to the supply of the motor and then from the return from the motor to the exhaust as indicated. In all cases in the respective figures, the flow is shown by the arrows. When it is stated that the valve seats of the four-way valve are closed, the position will be as indicated as in the sectional view in Fig. 10 pertaining to the valve seat 62. When a valve port is referred to as being open, it will be understood as being in the position shown in relation to the seat 61 of the same figure.

Thus it will be apparent that the four fluid pressure supplying lines, namely 47, 48, 49 and 51, upon predetermined functioning of the diaphragm valve are interconnected between the two valves previously referred to and when the automatic control valve 16 is set in the open position the pressure to these four lines is predeterminedly supplied to the top of the diaphragm of the four-way valve 17. Pressure shuts off two ports of the four-way valve thus allowing pressure to enter through one port to the motor and the other port allows for discharge from the motor to atmosphere. Thus when a drop in pressure in the main line occurs, the spring in the automatic control valve, designated 19 forces the diaphragm 18 downward upon the seat 30, which in turn changes the direction of flow from that shown in Fig. 12 to that shown in Fig. 13 by sealing the opposite port in the valve 17 and allowing the reversal of flow to the air motor and exhaust. In this manner the air motor designated 3 will then close the main valve. The position indicator 81 on the valve moves from the word "open" to the word "closed" to follow changement of wording shown in Fig. 4. The word "free" designates manual operation suitability of the main valve, as previously explained.

Figure 7:
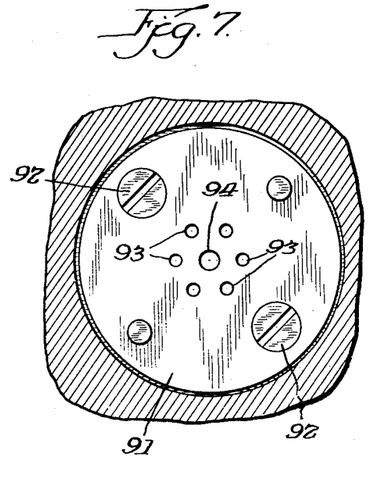
Fig. 7 is an enlarged sectional view of the pilot valve port orifice taken on the line 7—7 of Fig. 6.
Figure 8:
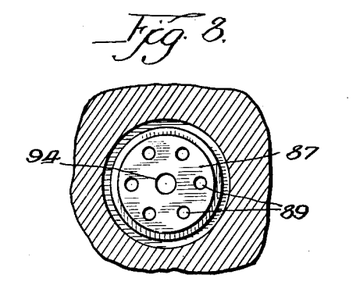
Fig. 8 is an enlarged sectional view taken on the line 8—8 of Fig. 6.
Figure 9:
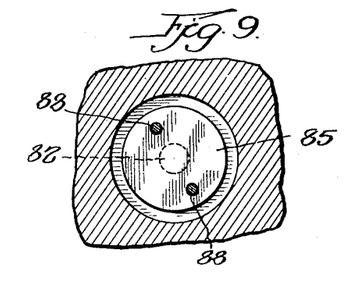
Fig. 9 is an enlarged sectional view taken on the line 9—9 of Fig. 6.

In a manner of further explaining the desired movement of the handle 81, reference is made to Figs. 6 to 9 inclusive. It should be understood that the pressure reducing valve 16 is provided with the finger-tip control unit (Fig. 6) employing the stem 82 which is journaled within the stuffing box gland 83 and the packing 84, having attached or integral therewith at a lower end portion a head 85 fitting within the chamber 86 and engaging by means of the oppositely disposed lugs the correspondingly apertured disc 87. The latter member is apertured at 89 as indicated in Fig. 8 to match upon suitable rotation with similar apertured portions 93 as shown in Fig. 7. The air inlet supply 95 at the side of the control casing (Fig. 6) provides for the entrance of fluid to the chamber 86. A central aperture 94 in the plates 91 handles suitably the desired exhaust therefrom. The detailed manner in which the device functions in providing for the distribution of the fluid flow from the control valve to the fluid motor or bypassing the latter member through the tubes 47, 48, 49 and 51, if desired, is substantially the same as that covered in the U. S. Patent 2,360,321 entitled "Fluid Distribution Systems," to Donald A. Griswold, granted October 17, 1944. The detailed description of operation is deemed unnecessary and accordingly omitted.

If desired, of course the entire piping system may be suitably housed so as to prevent tampering and exposure to severe weather conditions.

The details of construction may of course be varied within substantial limits and it is the desire therefore not to be restricted other than as determined by the scope of the appended claims.

What we claim is:

1. An automatic valve closing control system comprising a main valve on a main line, fluid operated means for actuating said main valve, a pressure actuated control valve, a pressure reducing regulator cooperating with said control valve, a reservoir connected to said automatic control valve, pressure responsive means for maintaining fluid pressure within said reservoir regardless of the reduction in pressure in the main line, a diaphragm operated four-way valve having a plurality of fluid connections with the said automatic control valve whereby when the automatic control valve is in the open position with pressure in two of the plurality of fluid connections as supplied to the top of the diaphragm of the said four-way valve at least a portion of the fluid pressure shuts off two of the other fluid connections of the said four-way valve, allowing pressure to enter through one connection to the fluid operated means and the other port allowing for discharge from the fluid operated means to atmosphere, resilient means provided by the said automatic control valve for selectively actuating the diaphragm of the four-way valve whereby the flow from the first two of the fluid connections to the other two fluid connections is changed to close off the opposite fluid connections in the said four-way valve to allow a reversal of flow to the said fluid operated means and exhaust therefrom, whereby upon completion of the latter cycle the said main valve is closed by the said fluid operated means, the said pressure reducing regulator reducing the main line pressure to the required pressure necessary to operate the said latter fluid operated means.

2. A valve closing control system comprising in combination a valve on a main line, fluid operated means for actuating said main valve, an automatic control valve having pressure actuated means therewithin, a pressure reducing regulator valve cooperating with said latter control valve for reducing the main line pressure to the pressure required to operate the said fluid operated means, a four-way valve having a plurality of connections with the said automatic control valve, a reservoir connected with the said main valve, pressure actuated means between said reservoir and the said main valve, the said pressure actuated means being normally closed to maintain fluid pressure within the said reservoir regardless of the drop in pressure in the main line, pressure responsive means within said four-way valve in communication with said plurality of connections, the said automatic control valve selectively providing for fluid distribution in certain of the connections between the said control valve and the four-way valve to allow fluid to enter one connection to the fluid operated means and to the other connection allowing for the discharge of the fluid operated means to atmosphere.

3. In a fluid operated actuating system for valves or the like, comprising in combination a fluid operated valve to be actuated, a reservoir for holding under pressure fluid to actuate said main valve, an automatic control valve having selective actuating means for diverting fluid to said fluid operated valve, a pressure responsive four-way valve having means reacting to the selective actuating means of the said automatic control valve, pressure reducing regulator means between said fluid actuating means and the said reservoir, a relief valve cooperating with the said pressure reducing regulator whereby in the event of the failure of the latter member line fluid pressure is discharged through the relief valve to atmosphere to safeguard the said fluid operated valve means, the said four-way valve providing for the flow of fluid to the said fluid actuating means subject to control by the said automatic control valve, a plurality of pipe lines provided between said four-way valve and said automatic control valve, the said automatic control valve providing in its free position for pressure being applied to the top of the actuating means of the ports of the said four-way valve to supply pressure to the fluid operated valve to seal off pressure to its actuating means, the said relief valve being set for discharge at a pressure in excess of the discharge pressure of the said pressure reducing regulator means.

4. An automatic valve closing control system of the character described, the combination comprising a main valve, fluid operated motor means for actuating said main valve, a pressure actuated control valve, a pressure reducing regulator cooperating with the said control valve, a reservoir connected to said automatic control valve, pressure responsive means for maintaining pressure within said reservoir, a four-way valve with resilient pressure responsive means of operation and having a plurality of means communicating with the said automatic control valve, the automatic control valve having means to be set in the open position with pressure in two of the plurality of conduits as supplied to the upper portion of the said four-way valve allowing pressure to enter through one port to the said motor means and with one of the conduits allowing for discharge from the motor means to atmosphere, means cooperating with the automatic control valve whereby the flow from two of the conduits to the other two is changed to seal the opposite ports in the said four-way valve to distribute fluid flow to the said fluid motor actuating means and exhaust therefrom, whereby the said main valve is closed by said fluid motor actuating means.

5. A valve closing control system comprising a main valve, fluid motor operated means and manual means for actuating said main valve, an automatic control valve having pressure actuated means therewithin, a pressure reducing regulator valve cooperating with said latter control valve, a four-way valve to reduce the pressure normally flowing through the said main valve to the pressure required to actuate the said fluid operated means having a plurality of means of communication with the said automatic control valve, a reservoir connected with the said man valve, means between said reservoir and said main valve normally closed to maintain fluid within said reservoir under pressure, diaphragm means within said four-way valve, the said automatic control valve diverting pressure in certain of the communication means between the said control valve and the four-way valve, the latter valve having predetermined ports opened to allow both sides of said fluid motor operated means to exhaust to atmosphere whereby the main valve may be manually operated.

6. An emergency valve closing control system comprising a main valve, ported fluid motor operated means for actuating the said main valve, an automatic control valve having pressure actuated means therewithin, a pressure reducing regulator valve cooperating with said latter control valve and with said fluid operated means to limit the maximum operating pressure for the said motor operated means, a four-way pressure actuated valve having a plurality of ports in communication with the said automatic control valve, a reservoir connected with the said main valve, a check valve positioned between said reservoir and said main valve to prevent back flow, the said automatic control valve having resilient means providing for diversion of fluid flow in certain of the ports between the said valve and the four-way valve to allow fluid pressure to enter one port to the motor and the other port allowing for the discharge of the motor to atmosphere, fluid pressure being supplied to the upper portion of said four-way valve to permit selective seating of said valve in response to pressure changes in the line for the main valve.

7. In a fluid operated actuating system for valves or the like, comprising in combination a fluid operated valve to be actuated, a tank for holding fluid under pressure to actuate said main valve, an automatic control valve having combined manual and pressure actuated selective means for diverting fluid through said valve, a pressure actuated multi-way valve having closure means responsive to the said automatic control valve, pressure reducing means communicating with the said tank, relief means cooperating with the said pressure reducing means whereby in the event of the failure of the latter means line fluid pressure is discharged through the relief means to atmosphere to safeguard the said fluid actuating means, the said multi-way valve providing for the flow of fluid to the said fluid actuating means and being controlled by said automatic control valve, a plurality of fluid conveying means between said latter means, the said automatic control valve providing in its free position for pressure being applied to the said multi-way valve to supply pressure to the pressure actuated means to prevent flow of fluid to the said actuating means.

8. A valve closing control system comprising in combination a main valve, fluid operated means for actuating said main valve, an automatic control valve having pressure actuated means therewithin, a pressure reducing regulator valve cooperating with said latter control valve, a four-way valve having a plurality of conduits connected with the said automatic control valve, a reservoir connected with the said main valve, a check valve between said reservoir and said main valve to prevent back flow therebetween, the said check valve being normally closed to maintain the fluid within said reservoir under pressure, diaphragm means within said four-way valve, actuation of the said automatic control valve providing means for pressure being conveyed in certain of the conduits between the said valve and the four-way valve to shut off predetermined conduits in the latter thereby allowing pressure to enter at least one conduit over certain of the said diaphragm means to the fluid operated means and at least one other conduit to allow for the discharge of the fluid operated means to atmosphere, and with respective discharges to atmosphere from the reservoir, the automatic control valve, the said four-way valve and from the said fluid operated means.

9. A valve closing control system comprising in combination a valve on a main line, fluid operated means for actuating said main valve, an automatic control valve having pressure actuated means therewithin and being manually tripped to open, a pressure reducing regulator valve cooperating with said latter control valve, a four-way valve having a plurality of connections with the said automatic control valve, a reservoir connected with the said main valve, pressure actuated means between said reservoir and the said main valve, the said pressure actuated means being normally closed to maintain fluid pressure within the said reservoir regardless of the drop in pressure in the main line, interconnected pressure responsive means within said four-way valve in communicating with said plurality of connections, the said pressure responsive means being balanced within the four-way valve, the said automatic control valve being set to close at predetermined drop in pressure in the main line to provide for fluid distribution in certain of the connections between the said control valve and the four-way valve to allow fluid to enter one connection to the fluid operated means and to the other connection allowing for the discharge of the fluid operated means to atmosphere.

10. An automatic valve closing control system of the character described, the combination comprising a main valve, fluid operated motor means for actuating said main valve, a pressure actuated control valve, a pressure reducing regulator cooperating with the said control valve, a reservoir connected to said automatic control valve, pressure responsive means for maintaining pressure within said reservoir, a four-way valve with closure members in substantially a single plane with resilient means of operation for its closure members and having a plurality of substantially tubular flow conveying means communicating with the said automatic control valve, the automatic control valve having means to be set in the open position with pressure in two of the plurality of conduits as supplied to the upper portion of the said four-way valve allowing pressure to enter through one port to the said motor means and with one of the conduits allowing for discharge from the motor means to atmosphere, means cooperating with the automatic control valve whereby the flow from two of the conduits to the other two is changed to seal the opposite ports in the said four-way valve to distribute fluid flow to the said fluid motor actuating means and exhaust therefrom, whereby the said main valve is closed by the said fluid motor actuating means, the said automatic control valve being shiftable to a pressure free position to permit of its operation by hand.

11. An emergency valve closing control system comprising a main valve, ported fluid motor operated means for actuating the said main valve, an automatic control valve having pressure actuated means therewithin, a pressure reducing regulator valve cooperating with said latter control valve and with said fluid operated means to limit the maximum operating pressure for the said motor operated means, a four-way pressure actuated valve having a plurality of ports in communication with the said automatic control valve, a reservoir connected with the said main valve, a check valve positioned between said reservoir and said main valve to prevent back flow, the said automatic control valve having resilient means providing for diversion of fluid flow in certain of the ports between the said valve and the four-way valve to allow fluid pressure to enter one port to the motor and the other port allowing for the discharge of the motor to atmosphere, the said automatic control valve having ported discs revolvable to provide for selective communication between the said control valve and the ports of the said four-way valve.

12. In a combined manual and fluid operated actuating system for valves or the like, comprising in combination a fluid operated valve to be actuated, a tank for holding fluid under pressure to actuate said main valve, an automatic control valve having combined manual and pressure actuated selective means for diverting fluid through said valve, a pressure actuated multiway valve having closure means responsive to actuation of the said automatic control valve, pressure reducing means communicating with the said tank, relief means cooperating with the said pressure reducing means whereby in the event of the failure of the latter means line fluid pressure is discharged through the relief means to atmosphere to safeguard the said fluid actuating means, the said multi-way valve providing for the flow of fluid to the said fluid actuating means and being controlled by said automatic control valve, a plurality of fluid conveying means between said latter means, the said automatic control valve being manually tripped to provide in its pressure free position for pressure being applied to the said multi-way valve to supply pressure to the pressure actuated means to prevent flow of fluid to the said actuating means and to permit manual operation of the normally fluid operated first named valve.

13. In a fluid operated actuating system for valves or the like, comprising in combination a fluid operated valve to be actuated in a main line, a reservoir connected to the main line for holding under pressure fluid to actuate said main line valve, an automatic control valve having selective actuating means for diverting fluid to said fluid operated valve, a pressure responsive four-way valve having diaphragm supported means reacting to the selective actuating means of the said automatic control valve, pressure reducing regulator means between said fluid actuating means and the said reservoir, a relief valve cooperating with the said pressure reducing regulator whereby in the event of the failure of the latter member line fluid pressure is discharged through the relief valve to atmosphere to safeguard the said fluid operated valve means, the said four-way valve providing for the flow of fluid to the said fluid actuating means subject to control by the said automatic control valve, a plurality of pipe lines provided between said four-way valve and said automatic control valve, the said automatic control valve providing in its free position for pressure being applied to the top of the actuating means of the ports of the said four-way valve to supply pressure to the fluid operated valve to seal off pressure to its actuating means, the selective actuating means of the said automatic control valve including a diaphragm member responsive to pressure and movable to control the movement of fluid to the fluid operated valve upon the occurrence of changes in pressure in the main line.

14. A valve closing control system comprising in combination a main valve, fluid operated means for actuating said main valve, an automatic control valve having pressure actuated means therewithin, a pressure reducing regulator valve cooperating with said latter control valve, a four-way valve having a plurality of conduits connected with the said automatic control valve, a reservoir connected with the said main valve, a check valve between said reservoir and said main valve to prevent backflow therebetween, the said check valve being normally closed to maintain the fluid within said reservoir under pressure, diaphragm means within said four-way valve, the said automatic control valve providing for pressure in certain of the conduits between the said valve and the four-way valve to shut off predetermined conduits in the latter thereby allowing pressure to cooperate with the diaphragm means of said four-way valve and enter at least one conduit to the fluid operated means and at least one other conduit to allow for the discharge of the fluid operated means to atmosphere to permit manual operation of the said main valve.

EUGENE C. PETRIE.
JAMES TREFIL.

REFERENCES CITED

The following references are of record in the file of this patent:

UNITED STATES PATENTS

| Number | Name | Date |
|---|---|---|
| 1,893,462 | Wait | Jan. 3, 1933 |
| 2,381,447 | Hedene | Aug. 7, 1945 |

Certificate of Correction

Patent No. 2,530,722 November 21, 1950

EUGENE C. PETRIE ET AL.

It is hereby certified that error appears in the printed specification of the above numbered patent requiring correction as follows:

Column 10, line 7, after the word "valve" strike out the comma and words ", a four-way valve" and insert the same in line 10, after "means", first occurrence; line 12, for "man" read *main*; line 56, before "said" insert *operation of*; column 11, line 41, for "communicating" read *communication*;

and that the said Letters Patent should be read as corrected above, so that the same may conform to the record of the case in the Patent Office.

Signed and sealed this 16th day of January, A. D. 1951.

[SEAL]

THOMAS F. MURPHY,
*Assistant Commissioner of Patents.*